US008904269B2

(12) United States Patent
Antley

(10) Patent No.: US 8,904,269 B2
(45) Date of Patent: Dec. 2, 2014

(54) CREATING ACCESSIBLE, TRANSLATABLE MULTIMEDIA PRESENTATIONS

(75) Inventor: Jeffrey T. Antley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1593 days.

(21) Appl. No.: 11/267,851

(22) Filed: Nov. 4, 2005

(65) Prior Publication Data

US 2007/0106927 A1    May 10, 2007

(51) Int. Cl.
*G06F 3/00* (2006.01)
*G06F 17/22* (2006.01)
*G06F 17/28* (2006.01)

(52) U.S. Cl.
CPC .......... *G06F 17/289* (2013.01); *G06F 17/2247* (2013.01); *G06F 17/227* (2013.01)
USPC ....................................................... 715/202

(58) Field of Classification Search
CPC ............ G06F 17/30056; G06F 3/0484; G06F 17/211; G06F 17/22
USPC .......... 715/200, 234, 245, 254, 255, 730, 202
See application file for complete search history.

(56) References Cited

U.S. PATENT DOCUMENTS

| | | | |
|---|---|---|---|
| 5,966,685 A * | 10/1999 | Flanagan et al. | 704/8 |
| 6,725,421 B1 | 4/2004 | Boucher et al. | |
| 6,792,615 B1 | 9/2004 | Rowe et al. | |
| 6,813,745 B1 | 11/2004 | Duncombe | |
| 7,574,668 B2 * | 8/2009 | Nunez et al. | 715/772 |
| 2002/0056097 A1 * | 5/2002 | Marion et al. | 725/38 |
| 2005/0091579 A1 * | 4/2005 | Mewherter et al. | 715/513 |
| 2007/0074167 A1 * | 3/2007 | Cohrs et al. | 717/124 |

OTHER PUBLICATIONS

O'Connell, William, et al, *Multimodal Query Support in Database Servers*, 1063-6404 1996 IEEE.

* cited by examiner

*Primary Examiner* — Kyle Stork
(74) *Attorney, Agent, or Firm* — Steven M. Greenberg, Esq.; CRGO Law

(57) ABSTRACT

The present invention provides a computer implemented method for generating translatable and accessible multimedia presentations. The method can include transforming a presentation master file defining a multimedia presentation into each of a text file and a variables file, generating a plurality of slides for a slide show with text strings from the text file and imagery and audiovisual elements from the variables file, and launching the slide show. Transforming a presentation master file into each of a text file and a variables file can include additionally transforming the presentation master file into a visual markup language document emulating the multimedia presentation. As such, in an aspect of the embodiment, the method further can include detecting an assistive technology, and rendering the visual markup language document in lieu of the slide show.

12 Claims, 3 Drawing Sheets

CREATING ACCESSIBLE, TRANSLATABLE MULTIMEDIA PRESENTATIONS

BACKGROUND OF THE INVENTION

1. Field of the Invention

The present invention relates to the field of multimedia presentation development tools and more particularly to slide show generators for multimedia presentations.

2. Description of the Related Art

Multimedia presentations relate to the composition of different presentation elements of different media types within a single, cohesive document or set of documents. The different elements generally can include text, imagery, audio and video. The combination of these different elements has proven to be effective in delivering powerful presentations for conveying important facts and ideas which otherwise might be lost upon an audience where the presentation is limited only to dry text. Thus, at present the multimedia presentation has become the standard-bearer technology for presenters everywhere.

Presentation tools, though plentiful in number, have always performed several basic tasks. First, presentation tools permit the selection and placement of different media elements within a single presentation. Second, presentation tools permit the creation of simple media elements such as text and basic line art within a single presentation. Yet, modern presentation tools have grown from simple development environments to complex tools. In this regard, presentations have trended to the dynamic requiring newfound functionality for controlling animation and other dynamic tools for presentations. These resulting complex tools now require substantial expertise to master.

To compound matters, it can never be presumed that an audience for a multimedia presentation is sighted and not sensory impaired in some manner. Presently, several assistive technologies have been widely distributed, usually in concert with the distribution of an operating system, to provide one or more alternative user interface mechanisms for the purpose of enhanced accessibility. Examples of assistive technologies include an audio user interface such as a screen reader. Yet, conventional multimedia tools are not able to produce multimedia presentations which can easily integrate with assistive technologies associated with a presentation tool processing a multimedia presentation.

BRIEF SUMMARY OF THE INVENTION

Embodiments of the present invention address deficiencies of the art in respect to slide show generators and multimedia presentation tools and provide a novel and non-obvious method, system and computer program product for creating accessible, translatable multimedia presentations. In one embodiment of the invention, a multimedia presentation data processing system can include a transformation enabled to transform a presentation master file defining a multimedia presentation into a text file, a variables file and a visual markup language specified form of the multimedia presentation. The system also can include a multimedia engine enabled to generate a slide show using text strings extracted from the text file, and imagery and audiovisual elements extracted from the variables file.

Notably, in one aspect of the embodiment, the multimedia engine can be further enabled to defer to rendering the visual markup language specified form of the multimedia presentation responsive to detecting an assistive technology. Also, in another aspect of the embodiment, the system further can include a second transformation enabled to transform a translated form of the presentation master file for a different language into a translated form of the text file, variables file and visual markup language specified form of the multimedia presentation for the different language. As such, the multimedia engine can be further enabled to generate the slide show using text strings extracted from the translated form of the text file, and imagery and audiovisual elements extracted from the translated form of the variables file for the different language responsive to identifying the different language as a preferred language for a runtime environment hosting the multimedia engine.

In another embodiment of the invention, a computer implemented method for generating translatable and accessible multimedia presentations can include transforming a presentation master file defining a multimedia presentation into each of a text file and a variables file, generating a plurality of slides for a slide show with text strings from the text file and imagery and audiovisual elements from the variables file, and launching the slide show. Transforming a presentation master file into each of a text file and a variables file can include additionally transforming the presentation master file into a visual markup language document emulating the multimedia presentation. As such, in an aspect of the embodiment, the method further can include detecting an assistive technology, and rendering the visual markup language document in lieu of the slide show.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for generating translatable and accessible multimedia presentations. In accordance with an embodiment of the present invention, a multimedia presentation can be defined in a master file for a base language. The master file can be translated into one or more language specific forms of the master file. Subsequently, the master file and the language specific forms of the master file can be processed into corresponding text files containing language specific, delimiter separated text extracted from the master file and the language specific forms of the master file, and also into a variables file containing a listing of sets of multimedia elements and display parameters extracted from the master file and the language specific forms of the master file.

Finally, the master file and the language specific forms of the master file can be processed into corresponding, language specific markup, for instance, markup which conforms to the hypertext markup language (HTML). When loading the multimedia presentation, the language for the host platform can be identified. As such, language specific markup can be located for the presentation master file and the language specific forms. If assistive technology such as a screen reader is detected for the host platform, the language specific, presentation specific markup can be rendered in a content browser. Otherwise, using the identified language of the host platform, a language specific text file and a variable file can be located.

If assistive technology is not detected, a collection of slides can be generated for the language specific text file and the variables file. In this regard, for each slide, a text string from the text file can be selected for inclusion in the slide, for instance as a title or heading, and one of the sets of multimedia elements from the variable file can be selected for inclusion in the slide. Also, the display parameters for the selected set of multimedia elements included in the slide can be applied to the slide so as to control the display of the slide during a slide show. In this way, a multimedia tool utilizing the foregoing structure and methodology can produce multimedia presentation which does not require multimedia development expertise and which can easily integrate with assistive technologies associated with a presentation tool processing the multimedia presentation.

Figure 1:
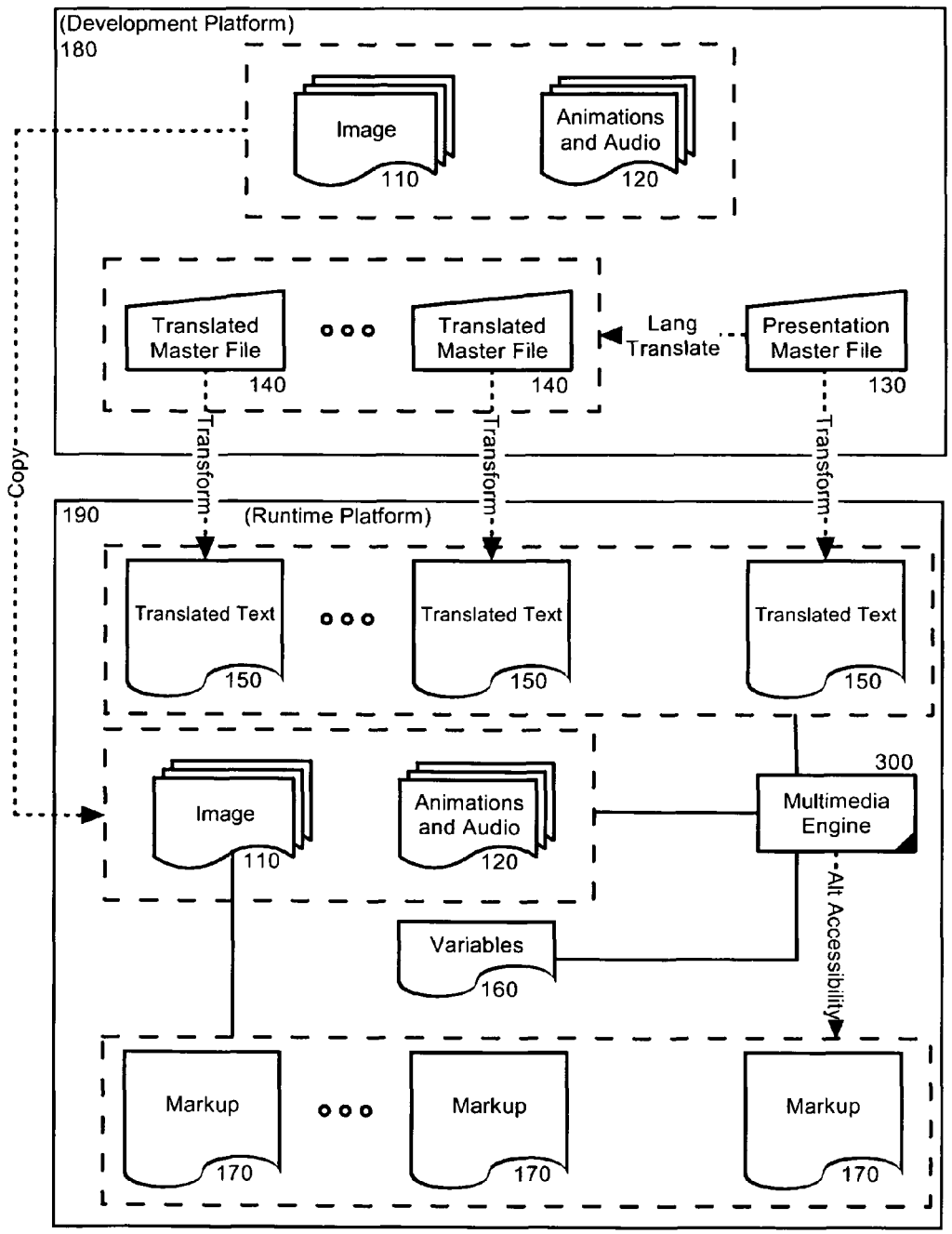
FIG. 1 is a schematic illustration of a multimedia presentation generation system configured to produce translatable and accessible multimedia presentation.

In further illustration, FIG. 1 is a schematic illustration of a multimedia presentation generation data processing system configured to produce translatable and accessible multimedia presentation. As shown in FIG. 1, the data processing system can include a development platform 180 and a runtime platform 190. A multimedia presentation including any combination of imagery 110 and audiovisual elements 120, including animation and audio, can be defined by a presentation master file 130 within the development platform 180.

The presentation master file 130 can be a neutrally formatted specification of a multimedia presentation, for instance a specification of a multimedia presentation formatted according to the extensible markup language (XML). The presentation master file 130 can include both text strings associated with different slides, screens or views within the presentation, as well as a listing of sets of the imagery 110 and audiovisual elements 120 which are to be included with different slides, screens or views of a multimedia presentation. Importantly, though the presentation master file 130 can include text strings for a specific, base language, the presentation master file 130 also can be translated to different translated master files 140 for different languages.

Each of the presentation master file 130 and the translated master files 140 can be transformed into translated text files 150. Each text file 150 corresponding to a master file 130, 140 can include delimiter specified text strings for different slides in a multimedia presentation. The delimiter specified text strings in the text file 150 can be extracted from a corresponding master file 130, 140 using well-known transformation logic, such as extensible style sheet transformations (XSLT). In addition to the translated text files 150, sets of the imagery 110 and audiovisual elements 120 which are to be included with different slides, screens or views of a multimedia presentation can be extracted from the master file 130, 140 and placed in a variables file 160. Again, the extraction can be undertaken using well-known transformation logic.

Optionally, one or more visual markup language documents 170, such as HTML formatted documents, can be generated for a corresponding one of the master files 130, 140. In this regard, each language specific one of the visual markup language documents 170 can include the presentable aspects of corresponding language specific ones of the master files 130, 140. The textual elements of the corresponding master file 130, 140, as well as the imagery 110 and audiovisual elements 120 can be formatted within one or more Web pages for viewing in a content browser. Subsequently, where an assistive technology in the runtime platform 190 is available, the multimedia presentation can be provided by rendering the appropriate language specific one of the visual markup language documents 170.

Figure 2:
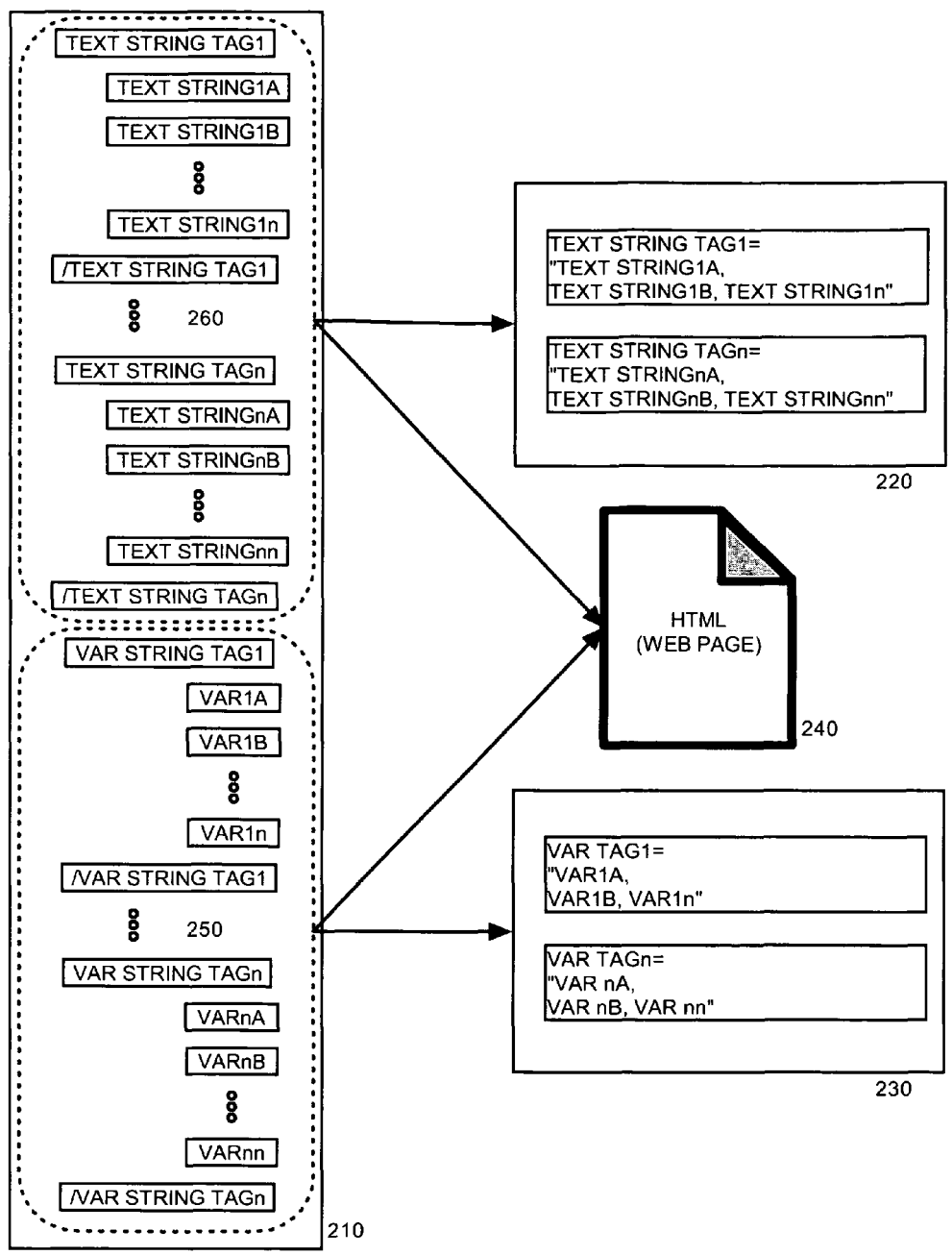
FIG. 2 is block diagram of a process for generating translatable and accessible multimedia presentations in the system of FIG. 1; and, FIG. 3 is a flow chart illustrating a process for generating translatable and accessible multimedia presentations in the system of FIG. 1.

In further illustration, FIG. 2 is block diagram of authoring format enabled for translation to a multimedia presentation in the system of FIG. 1. As shown in FIG. 2, a presentation master file 210 can specify text strings 260 for a multimedia presentation. The text strings can be organized according to slide order, for example. The presentation master file 210 further can specify one or more variables 250 for the multimedia presentation. The variables 250 can include sets of imagery and audiovisual elements to be included in different slides, as well, as presentation parameters for the imagery and audiovisual elements. Examples include how long a slide is to remain visible, methods for transitioning between slides, the volume of audio for audio playback and the speed of animation, to name only a few parameters.

The presentation master file 210 can be transformed into three separate files: a text file 220, a variables file 230, and a visual markup language file 240. The text file 220 can include a delimiter specified set of text strings extracted from the text strings 260 of the presentation master file 210. The variables file 230 can include a listing of the different sets of imagery and audiovisual elements extracted from the variables 250 of the presentation master file 210. Finally, the visual markup language file 240 can include a visual markup language specified document for the presentation defined by the presentation master file 210.

Returning to FIG. 1, in operation, the multimedia engine 300 can preload a presentation by first identifying a language for the runtime platform 190. Based upon the identified language, a text file 150 can be loaded which is specific to the identified language. Also, the variables file 160 can be loaded. The multimedia engine 300 can construct a slide show including one or more slides. Each slide can include a text string from the translated text file 150, and a set of imagery 110 and audiovisual elements 120 for the slide. Also, one or more parameters for the slide can be associated with the slide such as the duration of presentation of the slide. Once all of the slides have been constructed, the presentation can execute as a slide show.

Figure 3:
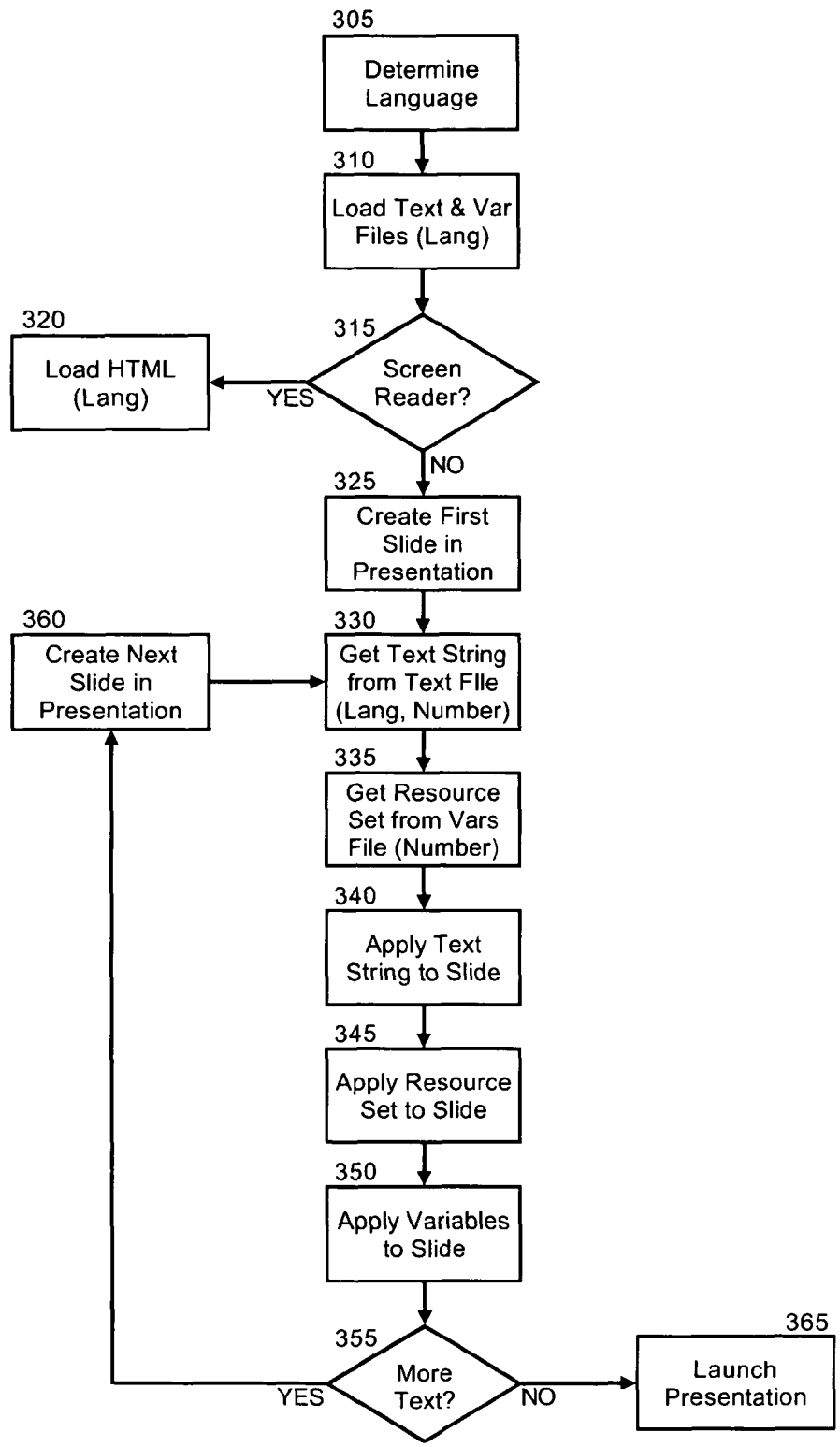

In more particular illustration, FIG. 3 is a flow chart illustrating a process for generating translatable and accessible multimedia presentations in the system of FIG. 1. Beginning in block 305, a language can be identified for the runtime platform. In block 310, a text file and a variables file can be loaded which corresponds to the identified language. In decision block 315, it can be determined whether an assistive technology has been activated or is available for the runtime platform. If so, in block 320 the visual markup language form of the master presentation file can be loaded and rendered in a content browser. Otherwise, the process can continue through block 325.

In block 325, a first slide can be created for the presentation. Subsequently, in block 330 a text string can be read in from the text file which corresponds to the first slide. Likewise, in block 335, one or more multimedia resources, such as imagery or audiovisual elements can be read in from the variables file which corresponds to the first slide. In block 340, the read in text can be applied to the created slide, as can the read in resources in block 345. Finally, in block 350, any variable parameters for the slide can be applied to the slide. In decision block 355, if more text remains to be processed in the text file, in block 360, another slide can be created and the process can repeat through block 330. When no more slides are to be created, in block 365 the multimedia presentation can be launched.

Thus, the present invention provides a combination of tool and technologies that solve the problem of allowing the creation of accessible, translatable multimedia, even by those lacking software development skills. To produce such a presentation, one need only gather the images or animations for display, create a master presentation file containing display parameters and text string, and provide the master presentation file to the transformations to produce files able to be processed into a multimedia presentation at runtime. Moreover, if an assistive technology is available, the presentation engine can defer to visual markup produced by the translations at development time.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A data processing system for generating translatable and accessible multimedia presentations, comprising:
    a development platform including a memory and a processor configured for
        defining a presentation master file including text strings associated with different slides within a multimedia presentation and also a listing of sets of multimedia elements included in the different slides; and
        transforming the presentation master file into a separate text file including only delimiter specified text strings for the different slides, a separate variables file containing the listing of sets of multimedia elements, and also a separate visual markup language specified form of the multimedia presentation; and,
    a runtime platform including a memory and a multimedia engine configured for
        determining whether at least one of an assistive technology is activated and whether the assistive technology is available for the runtime platform;
        loading the separate visual markup language specified form and also rendering the separate visual markup language specified form in a content browser upon determining that at least one of the assistive technology is activated and the assistive technology is available for the runtime platform; and,
        upon determining that at least one assistive technology is inactivated and the assistive technology is unavailable for the runtime platform, creating a plurality of slides for a slide show using text strings extracted from the separate text file and also multimedia elements extracted from the separate variables file and launching the slide show.

2. The system of claim 1, the processor of the development platform is further enabled to transform a translated form of the presentation master file for a different language into a translated form of the separate text file, separate variables file, and also separate visual markup language specified form of the multimedia presentation for the different language.

3. The system of claim 2, wherein the multimedia engine is further enabled to generate the slide show using text strings extracted from the translated form of the separate text file, and multimedia elements extracted from the translated form of the separate variables file for the different language responsive to identifying the different language as a preferred language for a runtime environment hosting the multimedia engine.

4. The system of claim 1, wherein the multimedia engine is further enabled to defer to rendering the separate visual markup language specified form of the multimedia presentation responsive to detecting an assistive technology.

5. The system of claim 1, wherein the multimedia engine is further enabled to generate the slide show using presentation parameters extracted from the separate variables file.

6. The system of claim 5, wherein the presentation parameters comprise slide transition times and slide display times.

7. A computer implemented method for generating translatable and accessible multimedia presentations, the method comprising:
    defining a presentation master file including text strings associated with different slides within a multimedia presentation and also a listing of sets of multimedia elements included in the different slides;
    transforming the presentation master file into a separate text file including only delimiter specified text strings for the different slides, a separate variables file containing the listing of sets of multimedia elements, and also a separate visual markup language specified form of the multimedia presentation;

determining whether at least one of an assistive technology is activated and the assistive technology is available for the runtime platform;

loading the separate visual markup language specified form and also rendering the separate visual markup language specified form in a content browser upon determining that at least one of the assistive technology is activated and the assistive technology is available for the runtime platform; and, upon determining that at least one of the assistive technology is inactivated and the assistive technology is unavailable for the runtime platform, creating a plurality of slides for a slide show using text strings extracted from the separate text file and also multimedia elements extracted from the separate variables file and launching the slide show.

8. The method of claim 7, further comprising:

translating the presentation master file into a translated form of the presentation master file for a different language; and, transforming the translated form of the presentation master file into each of a translated form of the separate text file and a translated form of the separate variables file.

9. The method of claim 8, further comprising:

identifying the different language as a preferred language for a runtime platform for the slide show;

generating a plurality of slides for a slide show with text strings from the translated form of the separate text file and multimedia elements from the translated form of the separate variables file; and, launching the slide show in the runtime platform.

10. A computer program product comprising a computer usable storage device storing thereon computer usable program code for generating translatable and accessible multimedia presentations, said computer program product including:

computer usable program code for defining a presentation master file including text strings associated with different slides within a multimedia presentation and also a listing of sets of multimedia elements included in the different slides;

computer usable program code for transforming the presentation master file into a separate text file including only delimiter specified text strings for the different slides, a separate variables file containing the listing of sets of multimedia elements, and also a separate visual markup language specified form of the multimedia presentation;

computer usable program code for determining whether at least one of an assistive technology is activated and the assistive technology is available for the runtime platform;

computer usable program code for loading the separate visual markup language specified form and also rendering the separate visual markup language specified form in a content browser upon determining that at least one of the assistive technology is activated and the assistive technology is available for the runtime platform; and, computer usable program code for, upon determining that at least one assistive technology is inactivated and the assistive technology is unavailable for the runtime platform, creating a plurality of slides for a slide show using text strings extracted from the separate text file and also multimedia elements extracted from the separate variables file and computer usable program code for launching the slide show.

11. The computer program product of claim 10, further comprising:

computer usable program code for translating the presentation master file into a translated form of the presentation master file for a different language; and, computer usable program code for transforming the translated form of the presentation master file into each of a translated form of the separate text file and a translated form of the separate variables file.

12. The computer program product of claim 11, further comprising:

computer usable program code for identifying the different language as a preferred language for a runtime platform for the slide show;

computer usable program code for generating a plurality of slides for a slide show with text strings from the translated form of the separate text file and multimedia elements from the translated form of the separate variables file; and, computer usable program code for launching the slide show in the runtime platform.

* * * * *